(12) United States Patent
Brown

(10) Patent No.: US 7,856,970 B1
(45) Date of Patent: Dec. 28, 2010

(54) COOKING GRID

(76) Inventor: James D. Brown, P.O. Box 492, Casalia, OH (US) 44824

(*) Notice: Subject to any disclaimer, the term of this patent is extended or adjusted under 35 U.S.C. 154(b) by 1134 days.

(21) Appl. No.: 11/430,115

(22) Filed: May 8, 2006

(51) Int. Cl.
A47J 37/07 (2006.01)

(52) U.S. Cl. .................. 126/25 R; 99/450; 99/427; 126/9 B; 126/29

(58) Field of Classification Search .............. 99/450, 99/427; 126/29, 30, 25 R, 9 B, 9 R, 38
See application file for complete search history.

(56) References Cited

U.S. PATENT DOCUMENTS

| | | | |
|---|---|---|---|
| 1,377,043 A | 5/1921 | Wilson | |
| 2,317,388 A | 4/1943 | Lake, Jr. | |
| 2,608,928 A | 9/1952 | McDonnell | |
| 3,636,938 A * | 1/1972 | Faltersack | 126/30 |
| 3,785,360 A * | 1/1974 | Martin | 126/30 |
| 3,800,777 A | 4/1974 | Gebien | |
| 3,858,495 A | 1/1975 | Gotwalt | |
| 3,939,761 A | 2/1976 | McGinty | |
| 4,112,832 A | 9/1978 | Severdia et al. | |
| 4,158,991 A | 6/1979 | Nakashima | |
| 4,226,255 A | 10/1980 | Tarrer | |
| 4,541,406 A | 9/1985 | DaSambiagio | |
| 4,559,869 A | 12/1985 | Hogan | |
| 4,583,263 A | 4/1986 | Wigley, Jr. | |
| 4,879,779 A | 11/1989 | Zalevsky et al. | |
| 5,007,403 A | 4/1991 | Chen | |
| 5,058,493 A | 10/1991 | Basek et al. | |
| 5,168,798 A | 12/1992 | Kristofich | |
| 5,488,943 A * | 2/1996 | Whitfield et al. | 126/152 R |
| 5,782,224 A | 7/1998 | Rabell | |
| 5,887,513 A | 3/1999 | Fielding et al. | |
| 5,927,267 A | 7/1999 | McKenzie | |
| D425,754 S | 5/2000 | Matteson et al. | |
| 6,135,014 A | 10/2000 | Chang | |
| 6,155,162 A | 12/2000 | Wang | |
| D444,340 S | 7/2001 | Wang | |
| D457,394 S | 5/2002 | Bartley | |
| 6,448,542 B2 * | 9/2002 | Wong et al. | 219/732 |
| 6,546,851 B1 | 4/2003 | Osborne | |
| 6,626,090 B2 | 9/2003 | McLemore et al. | |

* cited by examiner

Primary Examiner—Steven B McAllister
Assistant Examiner—Sarah Suereth
(74) Attorney, Agent, or Firm—MacMillan, Sobanski & Todd, LLC

(57) ABSTRACT

A cooking grid assembly includes a frame having first and second frame portions. The first and second frame portions each have one of a plurality of notches and a plurality of holes formed therein. A plurality of rods have first and second ends, such that the first end of each rod is disposed in one of the notches and holes of the first frame portion. The second end of each rod is disposed in one of the notches and holes of the second frame portion. A locking bar is removably attached to one of the first and second frame portions. The locking bar is movable between a closed position wherein the rods are retained in the one of the notches and holes, and an open position wherein the rods may be inserted and removed from the one of the notches and holes. An extension member is provided that is fixed to and outwardly movable relative to the frame to provide support to the frame. The extension member is movable between a storage position, an extended position, and a plurality of positions intermediate of the storage position and the extended position.

4 Claims, 4 Drawing Sheets

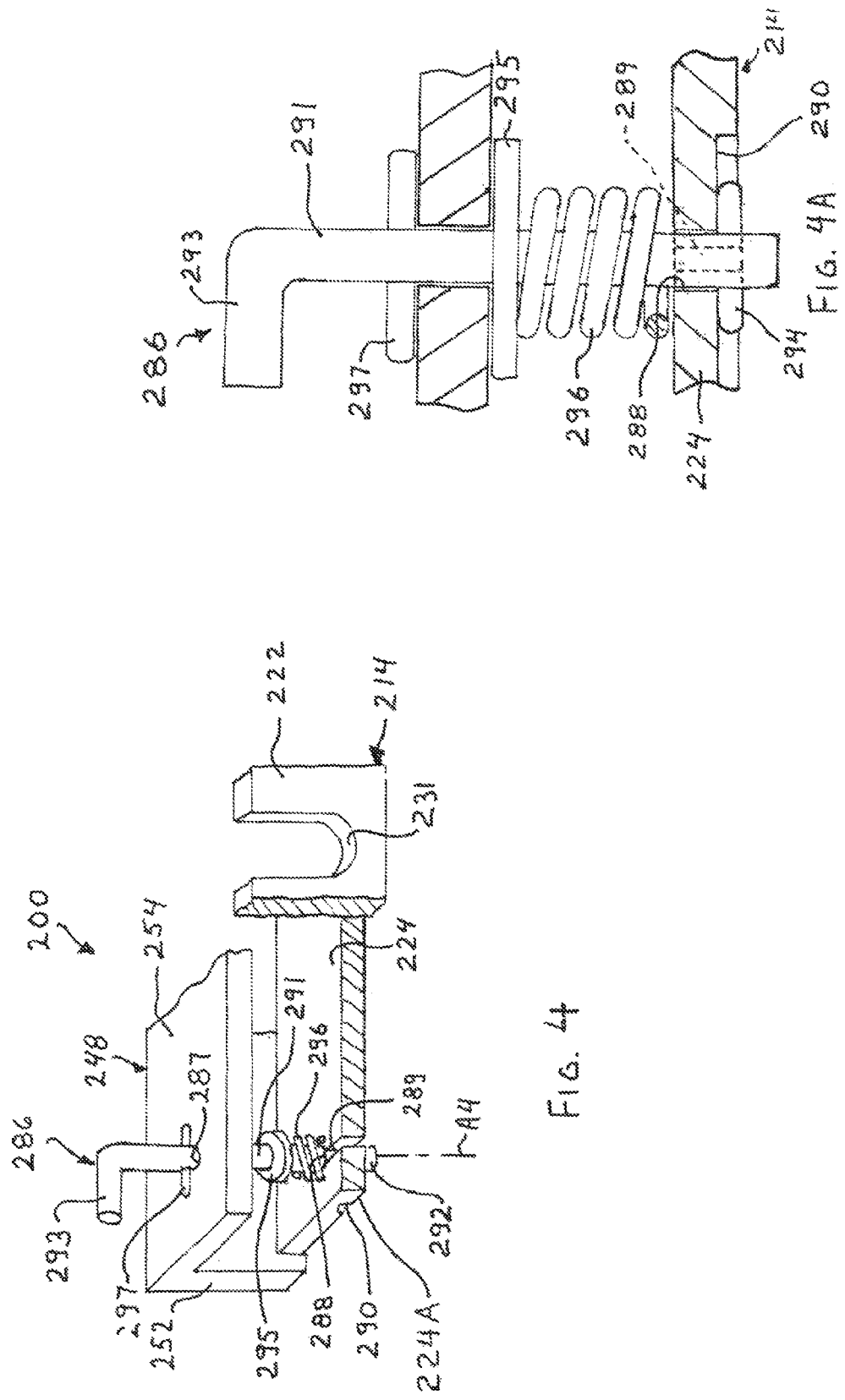

COOKING GRID

BACKGROUND

Various embodiments of a barbecue cooking grid are described herein. In particular, the embodiments described herein relate to an improved cooking grid that is easy to assemble, disassemble, clean, and cook upon.

SUMMARY

The present application describes various embodiments of a cooking grid assembly. One embodiment of the cooking grid assembly includes a frame having first and second frame portions. The first and second frame portions each have either a plurality of notches or a plurality of holes formed therein. A plurality of rods have first and second ends, such that the first end of each rod is disposed in the notches or holes of the first frame portion. The second end of each rod is disposed in the notches or holes of the second frame portion. A locking bar is removably attached to either the first or second frame portions. The locking bar is movable between a closed position wherein the rods are retained in the one of the notches and holes, and an open position wherein the rods may be inserted and removed from the notches or holes. An extension member is provided that is fixed to and outwardly movable relative to the frame to provide support to the frame. The extension member is movable between a storage position, an extended position, and a plurality of positions intermediate of the storage position and the extended position.

Other aspects of the cooking grid assembly will become apparent to those skilled in the art from the following detailed description, when read in light of the accompanying drawings.

BRIEF DESCRIPTION OF THE DRAWINGS

FIG. 4 is a perspective view of a portion of a third embodiment of the cooking grid illustrated in FIG. 1.

FIG. 4A is an enlarged elevational view of the latching mechanism illustrated in FIG. 4.

DETAILED DESCRIPTION

Figure 1:
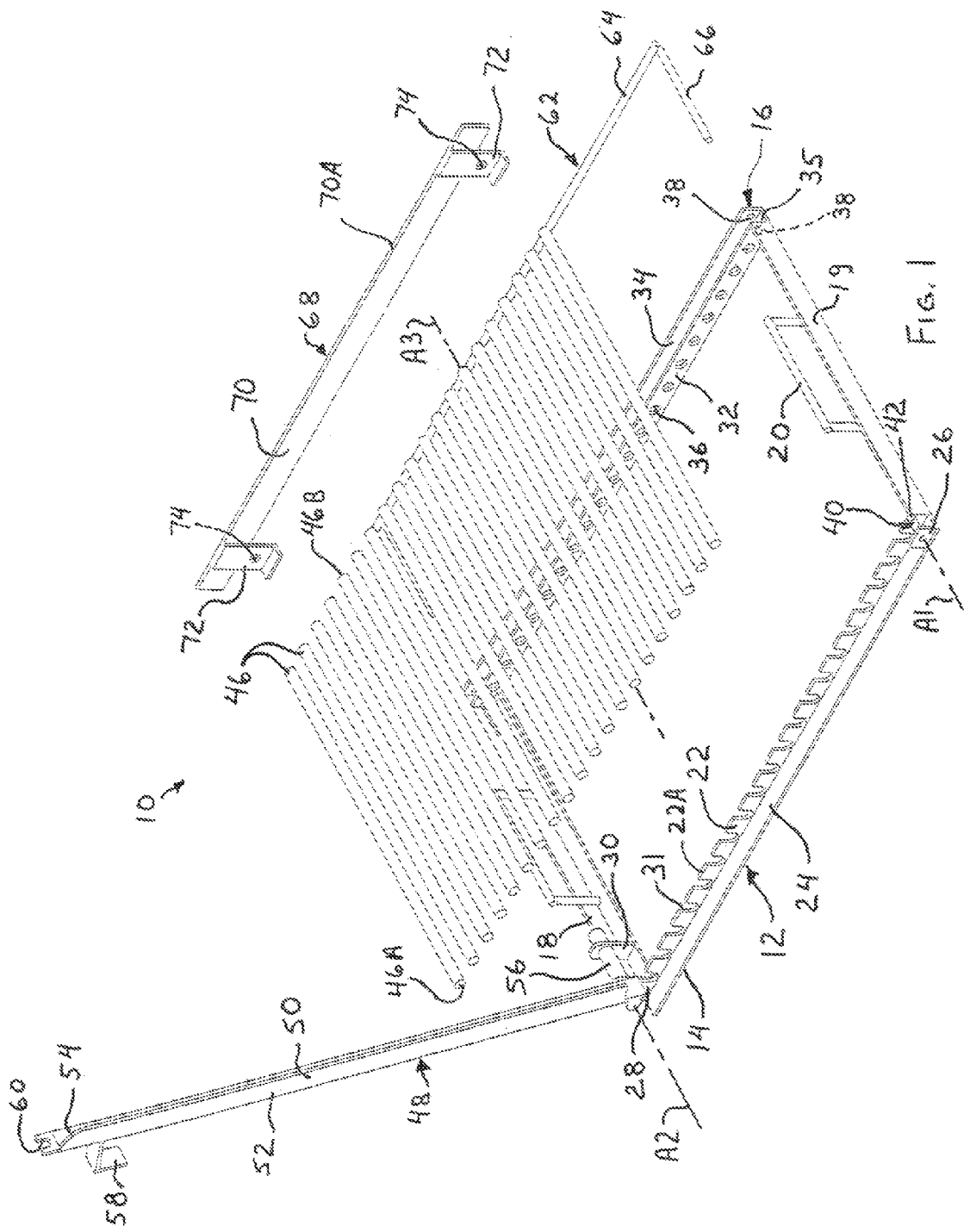
FIG. 1 is an exploded perspective view of a first embodiment of the cooking grid.
Figure 2:
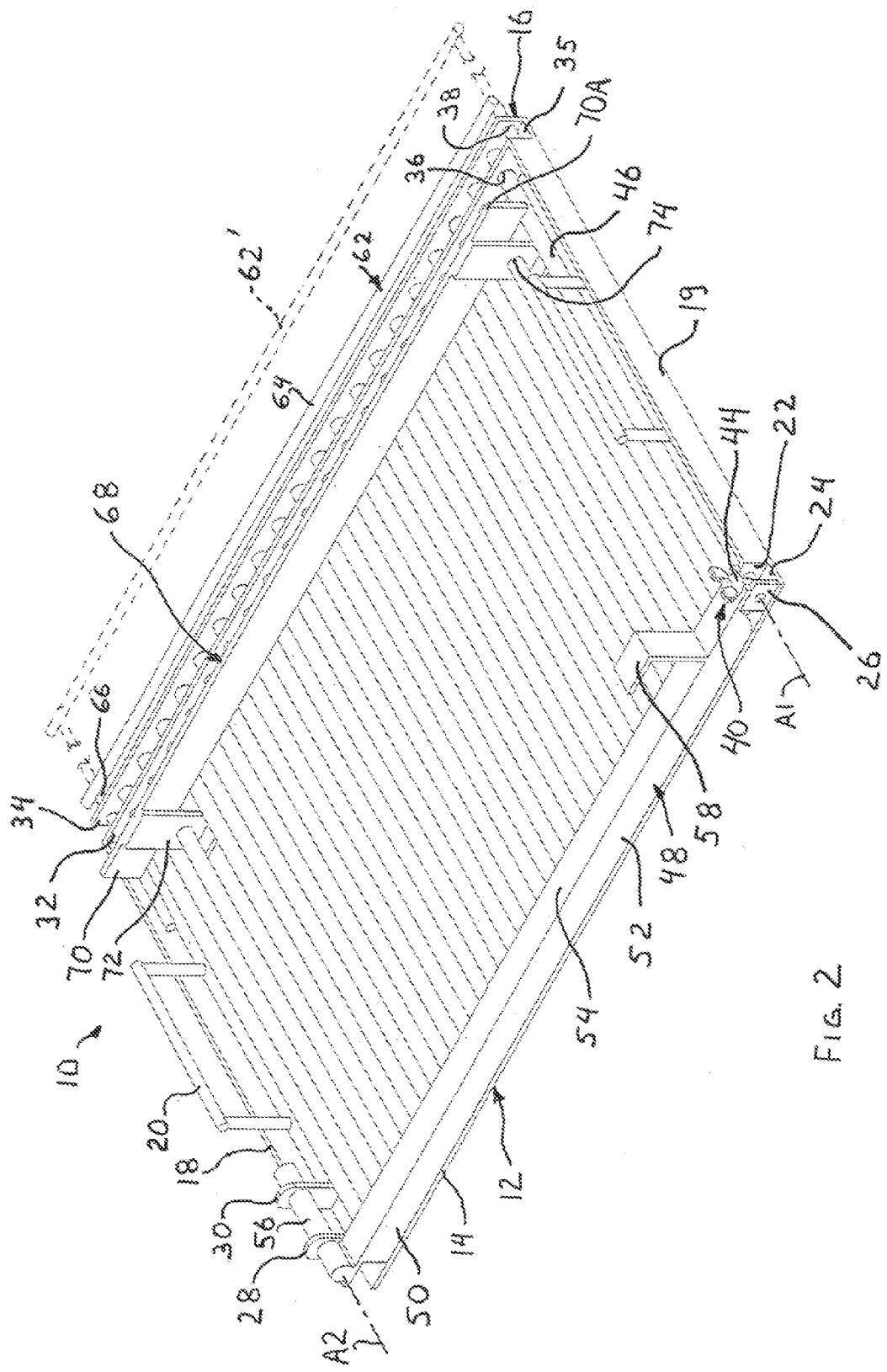
FIG. 2 is a perspective view of the cooking grid illustrated in FIG. 1, showing the cooking grid assembled and in the latched position.

Referring now to FIGS. 1 and 2, there is illustrated a first embodiment of a cooking grid assembly, indicated generally at 10. In the illustrated embodiment, the cooking grid assembly 10 includes a frame 12. The frame 12 may include a first, or user facing, frame portion 14, a second frame portion 16, and transverse side members 18 and 19. If desired, the side members 18 and 19 may include a carrying handle 20 extending upwardly or outwardly therefrom. It will be understood that the transverse side members 18 and 19, or a portion thereof, may be formed integrally with the first frame portion 14 and/or the second frame portion 16. The frame 12 has a length and a width which cooperate to define a first area.

In the illustrated embodiment, the first frame portion 14 has a substantially L-shaped transverse section and includes an upwardly extending (as viewed in FIG. 1) portion 22 and an outwardly extending portion 24. In the illustrated embodiment, a first tab 26 and a second tab 28 extend upwardly from the opposite ends of the outwardly extending portion 24. A third tab 30 may extend upwardly from the transverse side member 18.

Notches 31 may be formed in an upwardly facing edge 22A of the upwardly extending portion 22. In the illustrated embodiment, the notches 31 are substantially U-shaped and are linearly disposed and axially parallel at regular intervals. Alternatively, the notches 31 may have any other desired shape, such as for example, a rectangular or a V-shape. It will be understood that as used herein, notches may be any opening in the upwardly facing edge 22A large enough to receive and support a rod 46, as will be described in detail below. For example, a plurality of bosses (not shown) extending outwardly from the edge 22A may define notches 31 in the spaces between adjacent such bosses.

In the illustrated embodiment, the second frame portion 16 has a substantially U-shaped transverse section, and includes an upwardly extending (as viewed in FIG. 1) first wall portion 32, an upwardly extending second wall portion 34, and a bottom portion 35 substantially co-planar with the outwardly extending portion 24.

Rod holes 36, the purpose of which is described in detail below, may be formed in the first wall portion 32. In the illustrated embodiment, the rod holes 36 are substantially circular and are linearly disposed and axially parallel at regular intervals. The rod holes 36 are further axially aligned with the notches 31. Alternatively, the rod holes 36 may have any other desired shape, such as for example, rectangular or other polygonal shapes. It will be understood that the first frame portion 14 may include holes 36, and the second frame portion 16 may include notches 31. Additionally, the first frame portion 14 and the second frame portion 16 may both include notches 31, or the first frame portion 14 and the second frame portion 16 may both include holes 36.

Extension mounting holes 38, the purpose of which is described in detail below, may be formed in the first and second wall portions 32 and 34. In the illustrated embodiment, two such mounting holes 38 are illustrated in each of the first and second wall portions 32 and 34. It will be understood that any desired number of mounting holes 38 may be formed in the first and second wall portions 32 and 34. The illustrated mounting holes 38 are substantially circular. Further, the mounting holes 38 of the first wall portion 32 are axially aligned with the mounting holes 38 of the second wall portion 34. Alternatively, the mounting holes 38 may have any other desired shape, such as for example, rectangular or other polygonal shapes. It will be understood that the second wall portion 34 and bottom portion 35 may not be required depending on the specifics of the installation. As will be described in detail below, the second wall portion 34 may be used to position the rods 46 axially. Accordingly, the frame 12 may be formed without such wall and bottom portions 34 and 35.

In the embodiment illustrated in FIGS. 1 and 2, a latch 40 is pivotally mounted between the first frame portion 14 and the first tab 26 about a first pivot axis A1. The illustrated latch 40 includes an externally threaded first latch member 42 and an internally threaded fastener 44, as shown in FIG. 2. Any desired threaded fastener, such as a hex nut or a wing nut may be provided.

In the illustrated embodiment, a locking bar 48 is pivotally attached to the first frame portion 14 by a pivot pin 56 about a second pivot axis A2. The illustrated locking bar 48 has an elongate body 50 having a substantially L-shaped transverse section and includes a downwardly extending (as viewed in FIG. 2) portion 52, and an inwardly extending portion 54. In the illustrated embodiment, the pivot pin 56 extends inwardly from one end of the body 50 and a handle 58 extends outwardly from an opposite end of the body 50. A latching notch 60 may be formed in the inwardly extending portion 54. In the illustrated embodiment, the notch 60 is substantially U-shaped. Alternatively, the notch 60 may have any other desired shape, such as for example, rectangular or a V-shape. The locking bar 48 may be formed without the downwardly extending portion 52 in embodiments of the cooking grid assembly 10 where such a locking bar 48 is not required to provide axial positioning of the rods 46.

The illustrated cooking grid assembly 10 further includes a plurality of cooking rods 46 having a first end 46A, a second end 46B, and defining a rod axis A3. The installation and function of the rods 46 will be discussed in detail below.

In the embodiment illustrated in FIGS. 1 and 2, an extension member 62 is outwardly movably mounted to the second frame portion 16 of the frame 12. The illustrated extension member 62 includes an elongate body 64, and a pair of inwardly extending legs 66, although any desired number of legs 66 may be provided. The illustrated body 64 and legs 66 are substantially cylindrical in shape. Alternatively, the body 64 and legs 66 may have any other desired shape, such as for example, having a rectangular or other polygonal-shaped transverse section.

As best shown in FIG. 2, the legs 66 of the extension member 62 slidably mounted within the extension mounting holes 38 in the first and second wall portions 32 and 34. The extension member 62 is thereby movable between a fully retracted or storage position, as shown in FIG. 2, and an extended position, as shown by the phantom line 62' in FIG. 2. It will be understood that the extension member 62 may be moved to a plurality of positions intermediate the storage position and the extended position. It will be further understood that the frame 12 and the extension member 62, when in the extended position or one of the intermediate positions, have a combined width and length that cooperate to define a second area, such that the second area is larger than the first area defined by the frame 12 alone.

In the embodiment illustrated in FIGS. 1 and 2, a "hamburger catcher" or food flange 68 is movably mounted on the cooking grid assembly 10. The illustrated food flange 68 includes an elongate body 70 having an upwardly facing edge 70A and a pair of downwardly extending (as viewed in FIG. 2) mounting tabs 72, although any desired number of tabs 72 may be provided. Each of the tabs 72 has a mounting hole 74 formed therein. The illustrated body 70 and tabs 72 are substantially rectangular in shape. Alternatively, the body 70 and tabs 72 may have any other desired shape. For example, the body 70 may have indicia formed therein and the upwardly facing edge 70A may have a serpentine, irregular, or other non-linear shape, or may define a decorative design. The food flange 68 is provided to prevent a food item, such as a hamburger patty, from being inadvertently pushed or otherwise moved off of the cooking rods 46 by a user of the cooking grid assembly 10.

As best shown in FIG. 2, the tabs 72 of the food flange 68 are slidably mounted on respective ones of the rods 46, such that the food flange 68 is slidably mounted and moveable between the first frame portion 14 and the second frame portion 16.

The illustrated cooking grid assembly 10 and its component parts may be fabricated or otherwise formed from a suitable material, such as for example, steel, aluminum, alloys thereof, or other metals or alloy material. Ceramics are another example of suitable materials. Additionally, various coatings may be used to, for example, improve the stain resistance, corrosion resistance, or food release properties of the materials. Examples of such coatings include porcelain, Teflon®, and other non-stick coatings.

The first ends 46A of the rods 46 are prevented from moving transversely by the cooperation of the inwardly extending portion 54 of the locking bar 48 and the first frame portion 14 defining the notches 31. The second ends 46B of the rods are prevented from moving transversely by the surrounding first wall portion 32 of the second frame portion 16.

The rods 46 are positioned axially at the front by the abutting axially extending portion 52 of the locking bar 48, so as to prevent the first ends 46A of the rods 46 from sliding toward the front (normally closer to the user) and the second ends 46B from becoming disengaged from the rod holes 36 of the second frame portion 16. Similarly, the second wall portion 34 of the second frame portion 16 abuts the second ends 46B of the rods 46, positioning the rods 46 and preventing each of the rods 46 from sliding rearwardly (away form the usual position of the user) and preventing the first ends 46A of the rods 46 from thus becoming disengaged from the associated notch 31 of the first frame portion 14.

It will be appreciated that in some embodiments of the cooking grid assembly 10, the cooking grid assembly 10 will be installed in a barbeque grill enclosure (fire box) having four walls extending slightly above the height of the cooking grid assembly 10. In such an installed use, with the cooking grid assembly 10 disposed in (i.e. placed into) the firebox, the walls of the firebox may so closely abut the periphery of the cooking grid assembly 10 that either or both of the second wall portion 34 of the second frame portion 16 and the downwardly extending portion 52 of the locking bar 48 by be omitted. In such embodiments, the walls of the firebox can act to axially position the rods of the cooking grid assembly 10.

Figure 3:
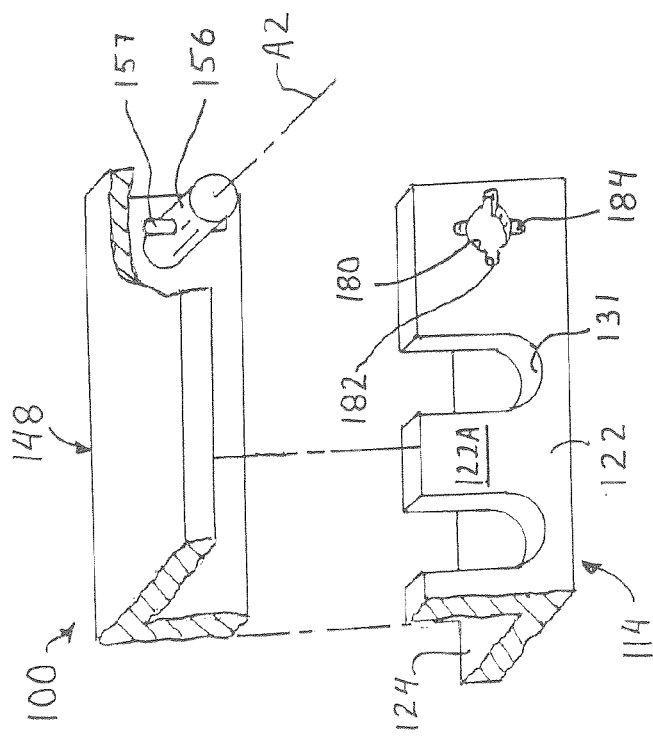
FIG. 3 is a perspective view of a portion of a second embodiment of the cooking grid illustrated in FIG. 1.

Referring now to FIG. 3, and using like reference numbers to indicate corresponding parts, there is illustrated a perspective view of a portion of a second alternate embodiment of the cooking grid assembly, indicated generally at 100. As shown therein, the cooking grid assembly 100 includes a first frame portion 114 and a locking bar 148. The illustrated first frame portion includes an upwardly extending (as viewed in FIG. 3) portion 122 and an outwardly extending portion 124. Notches 131 may be formed in the upwardly extending portion 122. In the illustrated embodiment, the notches 131 are substantially U-shaped and are linearly disposed and axially parallel at regular intervals. Alternatively, the notches 131 may have any other desired shape, such as for example, rectangular or a V-shape.

In the illustrated embodiment, a pivot pin receiving hole 180 is formed in the upwardly extending portion 122. The hole 180 includes radially extending locking pin notches 182. If desired, radially extending detent grooves 184 may be formed on an inwardly facing surface 122A of the upwardly extending portion 122. In the embodiment illustrated in FIG. 3, the detent grooves 184 are shown disposed at about 90 degrees relative to the locking pin notches 182. It will be understood however, that the detent grooves 184 may be disposed at any desired angle relative to the locking pin notches 182.

The illustrated locking bar 148 includes a pivot pin 156 fixed to and extending inwardly from the downwardly extending portion 152 of the locking bar 148. At least one locking pin 157 extends radially outward of the pivot pin 156.

It will be understood that the locking bar 148 locking bar illustrated in FIG. 3 is pivotally attached to the first frame portion 114 about the pivot axis A2, and is pivotal between a closed position and an open position. The locking bar 148 may further be mounted and/or removed from the first frame portion 114, such that no portion of the cooking grid assembly 100 is permanently deformed during the mounting and/or removal of the locking bar 148.

To install the locking bar 148 as illustrated in FIG. 3, the pivot pin 156 is inserted into the hole 180 such that locking pins 157 are aligned with the notches 182. The pin 156 may be pushed through the hole 180 until the locking pins 157 extend beyond the inwardly facing surface 122A of the upwardly extending portion 122. The locking bar 148 may then be pivoted about the pivot axis A2 between an open or unlatched position as shown in FIG. 1, and a closed or latched position as shown in FIGS. 2 and 4. As best shown in FIG. 3, the locking pins 157 may be seated in the detent grooves 184, when the locking bar 148 is in the closed position.

To remove the locking bar 148 from the cooking grid assembly 100, the bar 148 may be rotated upwardly to the open position, such as shown in FIG. 1, until the locking pins 157 are again aligned with the notches 182. The pin 156 may be pulled outwardly from the first frame portion 114 to disengage pin 156 from the hole 180, thereby removing the locking bar 148 from the cooking grid assembly 100. It will be appreciated that the locking bar 148 may be inserted and removed from the first frame portion 114 such that no portion of the cooking grid assembly 100 is permanently deformed during the removal of the locking bar 148.

Referring now to FIGS. 4 and 4A, and using like reference numbers to indicate corresponding parts, there is illustrated a perspective view of a portion of a second alternate embodiment of the cooking grid assembly, indicated generally at 200. As shown therein, the cooking grid 200 includes a first frame portion 214, a locking bar 248, and a latching mechanism 286. The illustrated first frame portion includes an upwardly extending (as viewed in FIG. 4) portion 222 and an outwardly extending portion 224. Notches 231 may be formed in the upwardly extending portion 222. In the illustrated embodiment, the notches 231 are substantially U-shaped and are linearly disposed and axially parallel at regular intervals to receive the rods 46. Alternatively, the notches 231 may have any other desired shape, such as for example, rectangular or a V-shape.

The illustrated locking bar 248 includes a downwardly extending (as viewed in FIG. 4) portion 252, and an inwardly extending portion 254. In the illustrated embodiment, a first latch receiving hole 287 is formed in the inwardly extending portion 254 of the locking bar 248.

In the illustrated embodiment, a second latch receiving hole 288 is formed in the outwardly extending portion 224. The hole 288 includes radially extending locking pin notches 289. Radially extending detent grooves 290 may be formed on a downwardly facing surface 224A of the outwardly extending portion 224. In the embodiment illustrated in FIG. 4, the detent groove 290 is shown disposed at about 90 degrees relative to the locking pin notches 289. It will be understood however, that the detent groove(s) 290 may be disposed at any desired angle relative to the locking pin notches 289.

The latching mechanism 286 illustrated in FIGS. 4 and 4A includes an elongate body 291 having a first end 292, a second end defining a handle portion 293, and an axis A4. At least one locking pin 294 and a spring flange 295 extend radially outward of the body 291. Alternatively, the spring flange could be other than as illustrated. For example, the spring flange 295 could comprise a washer supported by a pin and disposed between the retaining pin 297 and the spring 296. Alternatively, the spring flange may be any structure suitable for preventing upward axial movement (as viewed in FIG. 4A) of the spring 296.

A spring 296 is disposed between the locking pin 294 and the spring flange 295. At least one retaining pin 297 extends radially outward of the body 291 between the spring flange 295 and the handle portion 293. The retaining pin 295 may suitably be a pin, such as a roll pin inserted through a bore (not shown) formed through the body 291 after the body 291 is positioned in the first latch receiving hole 287 with the spring flange 295 abutting the inwardly extending portion 254 of the locking bar 248. The illustrated body 291 is substantially cylindrical in shape. Alternatively, the body 291 may have any other desired shape, such as for example, having a rectangular or other polygonal-shaped transverse section, provided the body 291 can rotate within the latch receiving holes 287 and 288 about the pivot axis A4.

As best shown in FIG. 4, the body 291 is slidably and pivotally mounted within the first latch receiving hole 287 about the pivot axis A4, such that a portion of the locking bar 248 is disposed between the spring flange 295 and the retaining pin 297. When the locking bar 248 is in a latched position, as shown in FIG. 4, the body 291 is disposed in the second latch receiving hole 288 of the first frame portion 214 such that the spring 296 urges the locking pin 294 into the detent groove 290. To unlatch the locking bar 248, the body 291 is rotated about the pivot axis A4 until the latching pin 294 aligns with the locking pin notch 289. The body 291 is then moved upwardly (as viewed in FIG. 4A) from the first frame portion 214 to disengage body 291 from the hole 288, thereby unlatching the locking bar 248 from the first frame portion 214.

To assemble the cooking grid assembly 10, the second ends 46B of the cooking rods 46 are inserted into the holes 36 of the second frame portion 16. If desired, the food flange 68 may then be slidably mounted on at least one rod (in FIG. 2, the food flange 68 is shown mounted on two rods 46, however the food flange 68 may be mounted on any desired number of rods 46, suitably configured, prior to installation of the rods into the holes 36). The first ends 46A of the cooking rods are then disposed in the notches 31 of the first frame portion 14. The locking bar 48 may then be pivotally attached to the first frame member 14 and moved to the closed position. The locking bar 48 may then be latched by the latch 40. Alternatively, as best shown in FIG. 3, the locking bar 248 may be latched to the first support member 214 by the latching mechanism 286. The cooking grid assembly 10 is thereby easy to assemble, disassemble, clean, and cook upon.

If it is desired to dispose the cooking grid assembly 10 about a grill having an opening larger than the frame 12, the extension member 62 may be moved outward of the frame 12 to the extended position 62', or to one of the intermediate positions, thereby enlarging the area of the cooking grid assembly 10.

Figure 5:
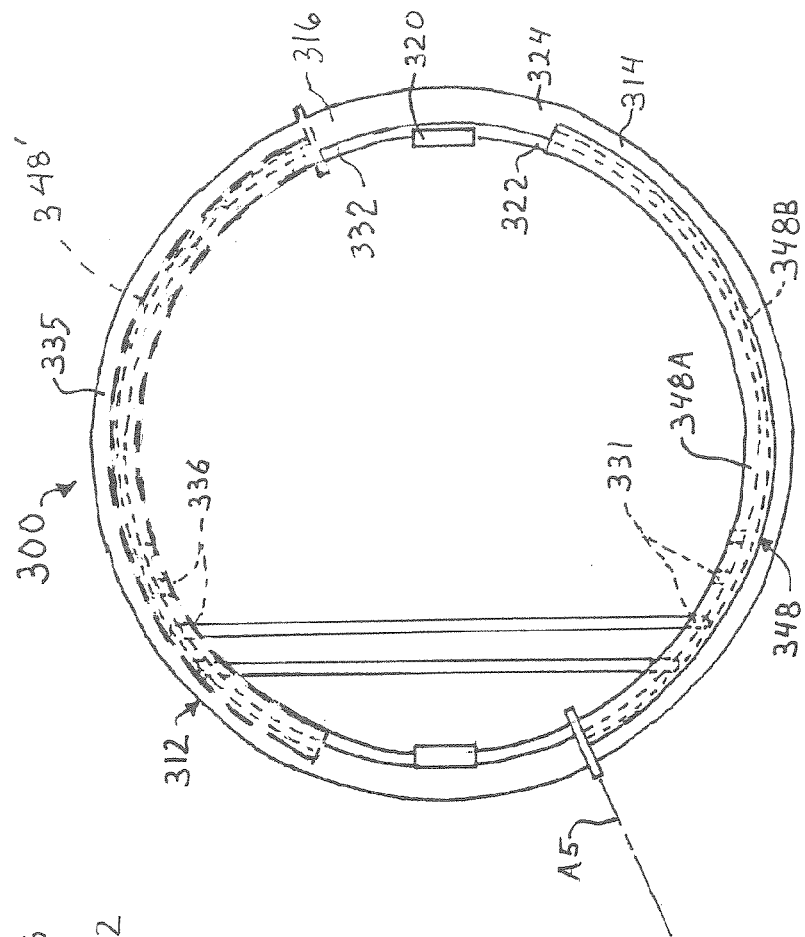
FIG. 5 is a schematic top plan view of a fourth embodiment of the cooking grid illustrated in FIG. 1.

Referring now to FIG. 5, there is illustrated a schematic top plan view of a portion of a fourth alternate embodiment of the cooking grid, indicated generally at 300. In the illustrated embodiment, the cooking grid 300 includes a frame 312. The frame 312 may include a first frame portion 314 connected to a second frame portion 316. It will be understood that the first frame portion 314 and the second frame portion 316 may be integrally formed. If desired, the frame portions 314 and 316 may include a pair of carrying handles, such as the substantially D-shaped handles 320 shown in FIGS. 1 and 2, extending upwardly or outwardly therefrom.

In the illustrated embodiment, the first frame portion 314 has a substantially L-shaped transverse section and includes an upwardly extending (toward the viewer as viewed in FIG. 5) portion 322 and a radially outwardly extending portion 324.

Notches 331 (for clarity, only a portion of the notches 331 are shown in FIG. 5) may be formed in an upwardly facing edge of the upwardly extending portion 322. The notches 331 may have any desired shape, such as substantially U-shaped, and may be arrayed along the upwardly extending portion 322 such that the notches 331 are axially parallel and disposed at regular intervals. Alternatively, the notches 331 may have any other desired shape, such as for example, a rectangular or a V-shape.

In the illustrated embodiment, the second frame portion 316 has a substantially L-shaped transverse section and includes an upwardly extending (toward the viewer as viewed in FIG. 5) portion 332 and an outwardly extending portion 335.

Rod holes 336 (for clarity, only a portion of the holes 336 are shown in FIG. 5) may be formed in the upwardly extending portion 332. The rod holes 336 may be substantially circular and may be arrayed along the upwardly extending portion 332 such that the holes 336 are axially parallel and disposed at regular intervals. The rod holes 336 are further axially aligned with the notches 331. Alternatively, the rod holes 336 may have any other desired shape, such as for example, rectangular or other polygonal shapes. It will be understood that the first frame portion 314 may include holes 336, and the second frame portion 316 may include notches 331.

In the illustrated embodiment, a locking bar 348 is pivotally attached to the first frame portion 314 about a fifth pivot axis A5. The illustrated locking bar 348 has a substantially arcuate shape corresponding to the shape of the first frame portion 314 and has a substantially L-shaped transverse section. The locking bar 348 includes a horizontally extending portion 348A overlaying the first frame portion 314 and a downwardly extending portion 348B on the outer periphery of the horizontally extending portion 348A that axially positions rods 346 (discussed below) disposed in the holes 336 and notches 331. It will be understood that a second locking bar 348' having a shape corresponding to the shape of the second frame portion 316 may be pivotally attached to the second frame portion 316, as illustrated by dashed lines in FIG. 5.

The locking bar 348 may include the latching mechanism 286 illustrated in FIGS. 4 and 4A. The locking bar 348 may further include a pivot pin such as the pivot pin 157. The locking bar 348 may therefore be mounted and/or removed from the first frame portion 314, such that no portion of the cooking grid assembly 300 is permanently deformed during the mounting and/or removal of the locking bar 148. The illustrated cooking grid 300 further includes a plurality of cooking rods 346 (only two such rods 346 are shown in FIG. 5). If desired, the cooking grid 300 may also include a substantially arcuate food flange (not shown), similar to the food flange 68.

The principle and mode of operation of the cooking grid assembly have been described in its various embodiments. However, it should be noted that the cooking grid assembly may be practiced otherwise than as specifically illustrated and described without departing from its scope.

What is claimed is:

1. A cooking grid assembly comprising:
a frame including first and second frame portions, said first and second frame portions each having one of a plurality of notches and a plurality of holes formed therein;
a plurality of rods having first and second ends, said first end of each rod being disposed in one of said notches and holes of said first frame portion, and said second end of each rod being disposed in one of said notches and holes of said second frame portion;
a first locking bar pivotally attached at a first part of said first locking bar to said first frame portion, said first locking bar being pivotal between a closed position wherein said first locking bar blocks removal of said rods from the one of said notches and holes in said first frame portion such that said rods are retained in the one of said notches and holes in said first frame portion, said closed position defining a latched position, and an open position wherein said rods may be inserted and removed from the one of said notches and holes in said first frame portion, said first locking bar further having a structure allowing said first locking bar to be removable from said first frame portion such that no portion of said cooking grid assembly is permanently deformed during the removal of said first locking bar, said open position defining an unlatched position; and
a second locking bar pivotally attached at a first part of said second locking bar to said second frame portion, said second locking bar being pivotal between a closed position wherein said second locking bar blocks removal of said rods from the one of said notches and holes in said second frame portion such that said rods are retained in the one of said notches and holes in said second frame portion, and an open position wherein said rods may be inserted and removed from the one of said notches and holes of said second frame portion, said second locking bar further having a structure allowing said second locking bar to be removable from said second frame portion such that no portion of said cooking grid assembly is permanently deformed during the removal of said second locking bar,
wherein said first frame portion includes a hole formed therein, said hole defining a radially outwardly extending pin notch, wherein a detent groove is formed on a downwardly facing surface of said first frame portion, and wherein at least said first locking bar is provided with a latching mechanism, said latching mechanism for said first locking bar including:
an elongate body having a first end, a second end, and a pin axis, said second end defining a handle portion;
at least one locking pin extending radially outward of said body;
a spring flange extending radially outward of said body;
a spring disposed between said locking pin and said spring flange; and
at least one retaining pin extending radially outward of said body between said spring flange and said handle portion;
wherein said body is slidably and rotatably mounted in said first locking bar, such that a portion of said first locking bar is disposed between said spring flange and said retaining pin; and
wherein in said latched position, said body of said latching mechanism is disposed in said hole of said first frame portion such that said spring urges said locking pin into said detent groove.

2. The cooking grid assembly according to claim 1, wherein each said rod includes an axis, said axes of said rods cooperating to define a plane substantially containing said rods, said cooking grid assembly further including a food flange extending perpendicularly to said plane containing said rods and extending upwardly from said rods, said food flange being slidably mounted on at least one rod.

3. The cooking grid assembly according to claim 1, wherein said frame is substantially rectangular in shape.

4. The cooking grid assembly according to claim 1, wherein said frame is substantially circular in shape.

* * * * *